INVENTOR.
Donald R. Green

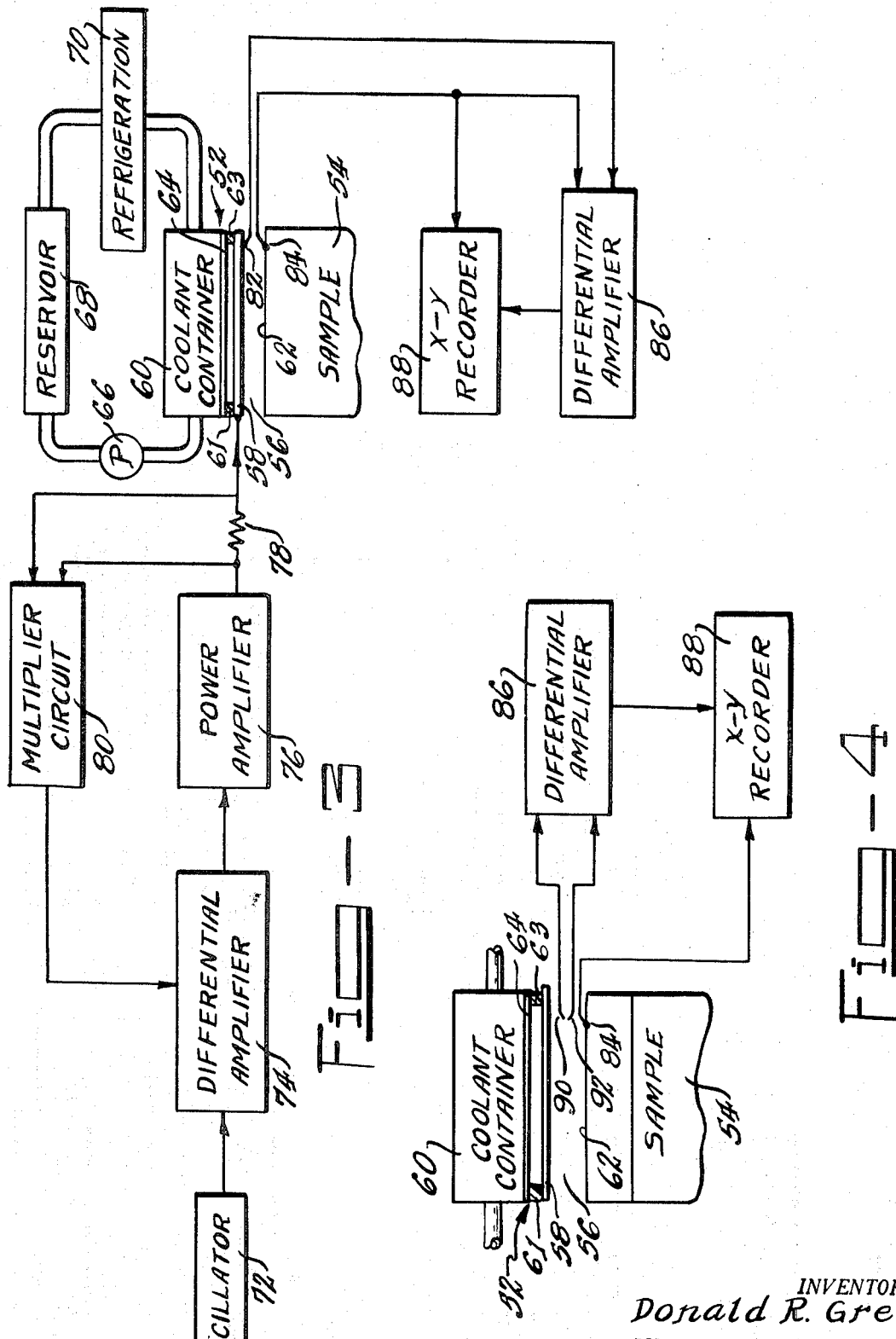

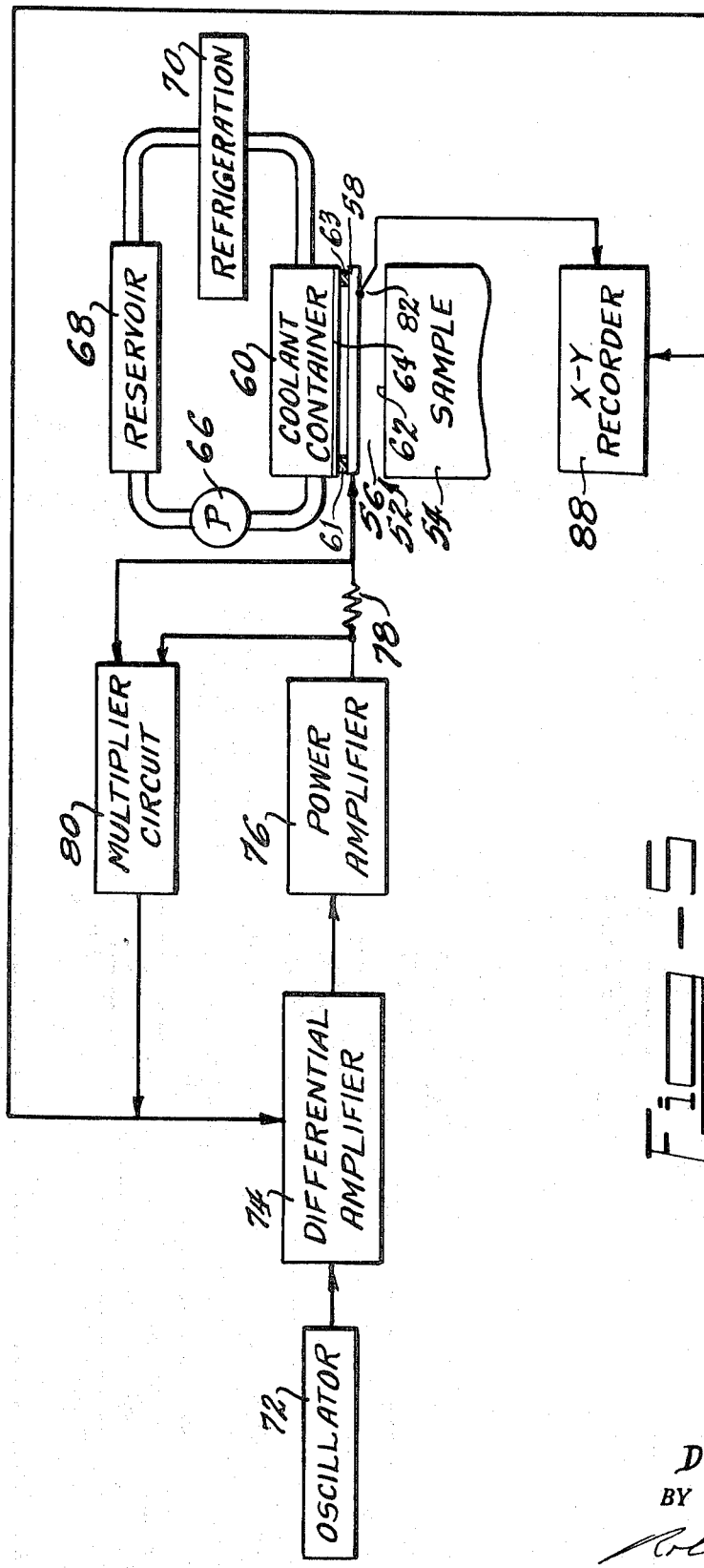

United States Patent Office 3,533,273
Patented Oct. 13, 1970

3,533,273
THERMAL SURFACE IMPEDANCE METHOD AND MEANS FOR NONDESTRUCTIVE TESTING
Donald R. Green, Richland, Wash., assignor to the United States of America as represented by the United States Atomic Energy Commission
Filed July 26, 1967, Ser. No. 656,640
Int. Cl. G01n 25/00
U.S. Cl. 73—15          8 Claims

ABSTRACT OF THE DISCLOSURE

Method and means for thermally nondestructively testing a sample including a thermal transducer mounted adjacent to and spaced from the test sample. The transducer is excited to provide a sinusoidal heat flow directed into the test sample. Means are provided to monitor the surface thermal impedance of the test sample responsive to said heat flow wherefrom a measure of the physical properties of the sample is nondestructively obtained.

---

This invention relates to method and means for nondestructively testing a sample and more particularly to methods and means utilizing thermal waves for nondestructively testing a sample.

The invention described herein was made in the course of, or under, a contract with the U.S. Atomic Energy Commission.

Thermal nondestructive testing can be used to measure thermal properties of materials at high and low temperatures and to detect flaws that are difficult or impossible to detect by other means. Since all materials conduct heat, response to thermal waves can be used to nondestructively test insulators, conductors, semiconductors and combinations of materials. In the past, transient thermal wave methods and means have been used to nondestructively determine the thermal properties of test samples (see T. Z. Harmanthy, "Variable State Methods of Measuring the Thermal Properties of Solids," Journal of Applied Physics, vol. 35, April 1964, page 1190). The transient method and means give accurate results. However, they are only applied to single-layer samples and require either access to two surfaces of the sample or embedding of thermocouples or heat sources within the samples. The prior art has also used sinusoidal thermal methods and means to nondestructively test samples. However, in the prior art methods and means utilizing sinusoidal thermal waves, it has been necessary to provide thermocouples attached at different points along the sample, access to two surfaces of the sample or that current be passed through the sample itself. Where it has been necessary that current be passed through the sample, the application of the sinusoidal thermal wave has been limited to samples that conduct electricity.

Accordingly, it is one object of the present invention to provide improved methods and means utilizing sinusoidal thermal waves for nondestructively testing a test sample.

It is another object of the present invention to provide methods and means utilizing the surface thermal impedance of a test sample to nondestructively test the sample.

It is yet another object of the present invention to provide methods and means utilizing sinusoidal thermal waves for nondestructively testing a test sample from only one surface thereof.

Other objects of the present invention will become more apparent as the detailed description proceeds.

In general, the present invention comprises a thermal transducer mounted adjacent and spaced from a test sample. The transducer is excited to provide a sinusoidal heat flow directed into the test sample. Means are provided to monitor the surface thermal impedance of the test sample responsive to said heat flow wherefrom a measure of the physical properties of the sample is obtained.

Figure 1:
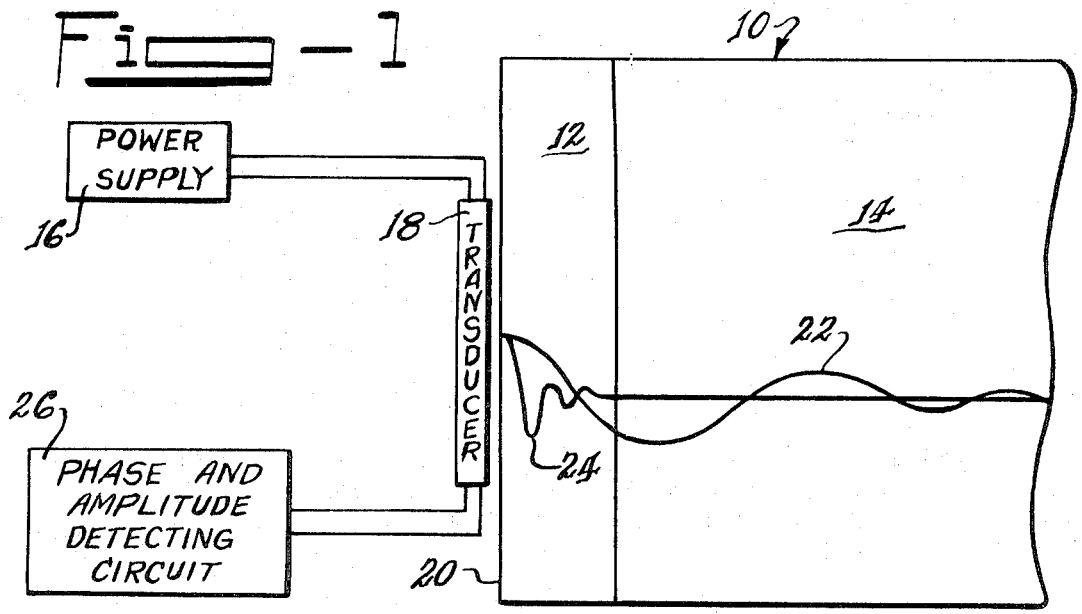
Figure 2:
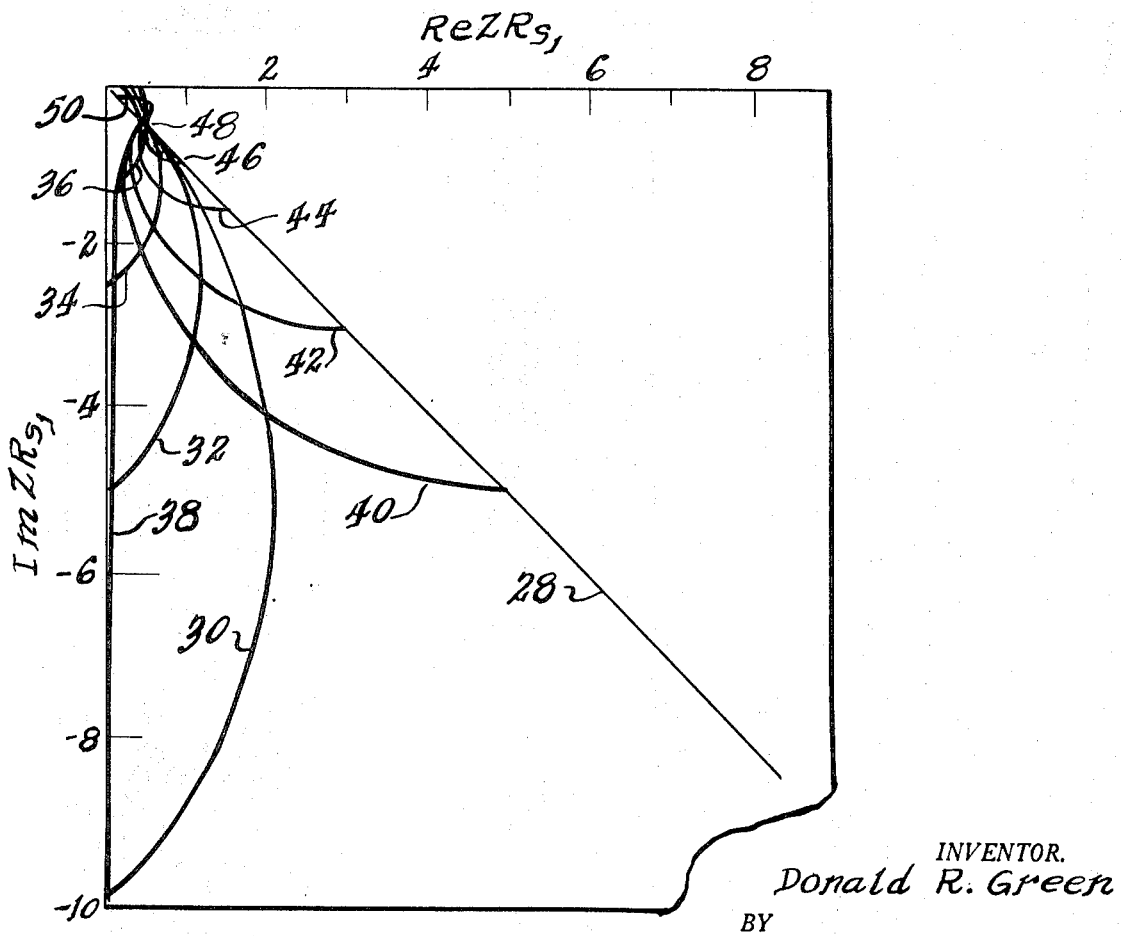
Figure 6:
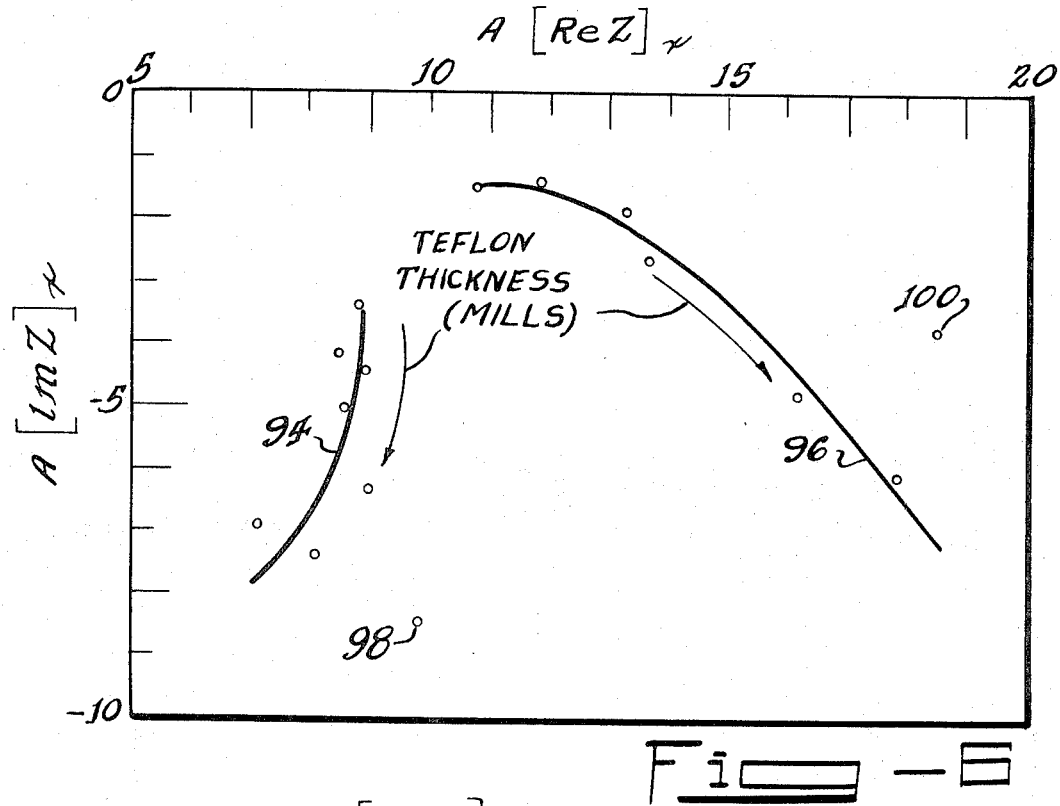
Figure 7:
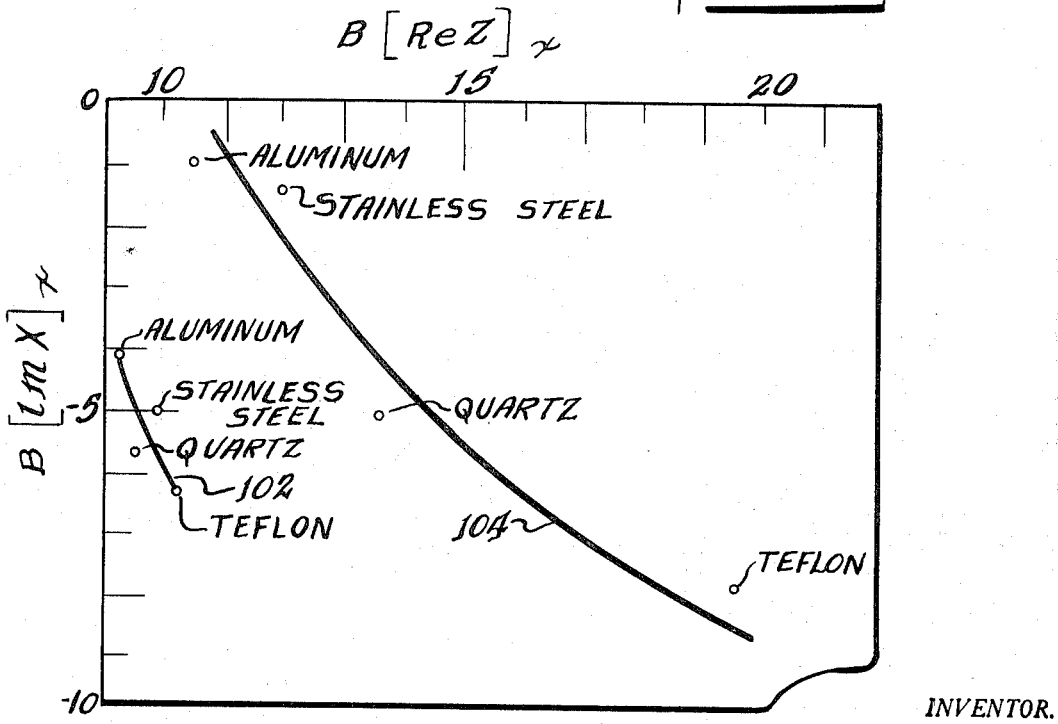

Further understanding of the present invention may best be obtained from consideration of the accompanying drawings wherein:

FIG. 1 is a block diagram of a general embodiment of an apparatus for the practice of the present invention;
FIG. 2 is an Argand plot of the surface thermal impedance of a test sample;
FIG. 3 is a block diagram of an apparatus for the practice of the present invention;
FIG. 4 is a block diagram illustrating a portion of the apparatus of FIG. 3 changed to provide an alternate apparatus for the practice of the present invention;
FIG. 5 is a block diagram of the preferred apparatus for the practice of the present invention;
FIG. 6 is a complex plane plot of measured input thermal impedances of the transducer of FIG. 5 for varying physical properties of test samples;
FIG. 7 is a complex plane plot of measured input thermal impedances of the transducer of FIG. 5 for varying physical properties of test samples.

Referring to FIG. 1, a general apparatus is shown for accomplishing the present invention. The sample 10 shown being tested is a two-layered sample, with the first layer 12 being finite and in good contact with a second layer 14 which is semi-infinite. A power supply 16 electrically excites with a sinusoidal electrical signal a thermal transducer 18 which is spatially mounted with respect to one surface 20 of the first layer 12 of sample 10. The thermal transducer 18 is oriented so that it transmits a sinusoidal steady-state thermal wave into the sample 10. FIG. 1 illustrates two such waves propagating through the two layers 12 and 14 of sample 10. The sinusoidal thermal wave 22 is a typical low-frequency thermal wave which has deep penetration into the second layer 14. The wave 24 is a typical high-frequency thermal wave with shallow penetration only into the first layer 12 of sample 10. The thermal impedance response of the sample surface 20 to the transmitted thermal waves from transducer 18 is measured via the transducer 18 by a phase and amplitude-sensing circuit 26.

In operation the power supply 16 generates continuous sinusoidal electrical power which is transformed into a continuous sinusoidal thermal wave by transducer 18 and transmitted into the layers 12 and 14 of sample 10. The response of the sample 10 to the sinusoidal thermal wave or heat flux is detected by the thermal transducer 18 and measured by the phase and amplitude-sensing circuit 26 in a manner which will hereinafter be appreciated.

Further understanding of the present invention may be obtained by consideration of the theory thereof. For purposes of understand, consideration is made with respect to the two-layered sample 10 wherein a finite first layer 12 of one material is in resistive contact with a semi-infinite layer 14 of a second material. By a semi-infinite second layer 14 it is to be understood that the second layer of material 14 extends from the contact joint between the layers 12 and 14 to infinity. It is to be understood that underlined symbols indicate quantities which are complex phasors and not ordinary vectors.

The equations for plane thermal waves in a material having thermal conductivity K are:

$$\partial T/\partial t = -(1/S\rho)(\partial q/\partial x) \qquad (1)$$

and $$q = -K\partial T/\partial x \qquad (2)$$

where $\partial$ is the thermal diffusivity. For a steady-state sinusp is the density of the material, $x$ is the distance from the surface of the sample in the direction of heat flow and $q$ is the heat flux. Combining Equations 1 and 2 one can obtain:

$$\alpha(\partial^2 q/\partial x^2) = \partial q/\partial t \qquad (3)$$

where $\partial$ is the thermal diffusivity. For a steady-state sinusoidal thermal plane wave having an angular velocity, $\omega = 2\pi f$, Equations 1–3 become:

$$\underline{T} = -(1/j\omega S\rho)(\partial \underline{q}/\partial x) \qquad (4)$$

$$\underline{q} = -K(\partial \underline{T}/\partial x) \qquad (5)$$

and $$\partial^2 \underline{q}/\partial x^2 = j\underline{q}(\omega S\rho)/K = \underline{\xi}^2 \underline{q} \qquad (6)$$

where $\underline{\xi} = (1+j)/\delta$ and $\delta$ is the penetration depth or distance measured from the surface of the same required for the sinusoidal thermal wave to be attenuated to $1/e$ of its surface value. Equation may be expressed as:

$$\underline{q} = \underline{A} \sinh \underline{\xi}x + \underline{B} \cosh \underline{\xi}x \qquad (7)$$

where $\underline{A}$ and $\underline{B}$ are constants.

With the finite thickness, $d$, of first layer 12 in resistive contact with the semi-infinite layer 14 of sample 10, let the thermal conductivity, specific heat and density of the first layer 12 be $K_1$, $S_1$ and $\rho_1$, respectively, and the corresponding properties of the second layer 14 be $K_2$, $S_2$ and $\rho_2$. Let $h$ be the conductance of the air gap between the layers. The conditions which must be satisfied are:

$$\lim_{x \to \infty} \underline{q} = 0, \qquad (8)$$

$$\underline{q}_1(d) = \underline{q}_2(d), \qquad (9)$$

and $$\underline{T}_1(d) = \underline{T}_2(d) + \underline{q}(d)/h, \qquad (10)$$

where the subscripts 1 and 2 indicate the first and second layers 12 and 14, respectively. The condition expressed by Equation 9 occurs since there is no appreciable energy storage in the contact between the layers 12 and 14 since it is assumed to be a purely resistive contact joint of infinitesimal thickness. Applying the condition given in Equation 8 to Equation 7, the heat flow in the semi-infinite layer 14 is shown to be:

$$\underline{q} = C \exp(-\underline{\xi}_2 x) = C \exp[-(1+j)x/\delta_2] \qquad (11)$$

Note that $\delta$ is the aforementioned depth at which the amplitude of the sinusoidal thermal wave has been attenuated to $1/e$ of the amplitude it had at the surface of the semi-infinite layer 14 and is equal to:

$$\delta = \sqrt{\frac{K}{\pi f S \rho}} \qquad (12)$$

The surface thermal impedance of the sample 10 is defined as:

$$\underline{Z} = [\underline{T}/\underline{q}]_{x=0} \qquad (13)$$

where $\underline{T}$ and $\underline{q}$ are, respectively, the temperature and heat flow phasors at the surface 20 of the sample 10. Further, $$\underline{Z} = -\underline{A}/[\underline{B}K_1\underline{\xi}_1] \qquad (14)$$

The ratio $\underline{A}/\underline{B}$ may be obtained by using Equations 4, 7 and 11 together with the boundary conditions given by Equations 9 and 10. Evaluating the ratio $\underline{A}/\underline{B}$ and using the definition given supra for $\underline{\xi}$, we obtain the expression for the surface thermal impedance of the sample 10.

$$\underline{Z} = -\underline{A}/\underline{B}K_1\underline{\xi}_1$$

$$= R_1 \left\{ \frac{\left[h^2(\theta^2+1) + \frac{\theta}{R_1}\left(h + \frac{\theta}{2R_1}\right)\right] \sinh 2a - \left[h^2(1-\theta^2) + \frac{\theta}{R_1}\left(h + \frac{\theta}{2R_1}\right)\right] \sin 2a + 2h\theta\left(h + \frac{\theta}{2R_1}\right) \cosh 2a + h\frac{\theta^2}{R_1} \cos 2a}{\left[h^2(\theta^2+1) + \frac{\theta}{R_1}\left(h + \frac{\theta}{2R_1}\right)\right] \cosh 2a - \left[h^2(1-\theta^2) + \frac{\theta}{R_1}\left(h + \frac{\theta}{2R_1}\right)\right] \cos 2a + 2\theta h\left(h + \frac{\theta}{2R_1}\right) \sinh 2a - h\frac{\theta^2}{R_1} \sin 2a} \right.$$

$$\left. -j \frac{\left[h^2(\theta^2+1) + \frac{\theta}{R_1}\left(h + \frac{\theta}{2R_1}\right)\right] \sinh 2a + \left[h^2(1-\theta^2) + \frac{\theta}{R_1}\left(h + \frac{\theta}{2R_1}\right)\right] \sin 2a + 2h\theta\left(h + \frac{\theta}{2R_1}\right) \cosh 2a - h\frac{\theta^2}{R_1} \cos 2a}{\left[h^2(\theta^2+1) + \frac{\theta}{R_1}\left(h + \frac{\theta}{2R_1}\right)\right] \cosh 2a - \left[h^2(1-\theta^2) + \frac{\theta}{R_1}\left(h + \frac{\theta}{2R_1}\right)\right] \cos 2a + 2\theta h\left(h + \frac{\theta}{2R_1}\right) \sinh 2a - h\frac{\theta^2}{R_1} \sin 2a} \right\}$$

$$(15)$$

In Equation 15, $$R_1 = (4\pi f S_1 \rho_1 K_1)^{-1/2}, \quad \theta = (K_2 \rho_2 S_2 / K_1 S_1 \rho_1)^{1/2} \qquad (16)$$

and $$a = d/\delta_1 = dK_1^{-1/2}(\pi f S_1 \rho_1)^{1/2} \qquad (17)$$

After measuring or computing $\underline{Z}$, surface temperatures resulting from heat flux $\underline{q}$ flowing into the surface of the first layer 12 can be computed as simply:

$$\underline{T} = \underline{q}\underline{Z} \qquad (18)$$

If the two layers 12 and 14 of the sample 10 are in perfect contact and the thickness of the first layer 12 is zero, then Equation 15 becomes:

$$\underline{Z} = (1-j)R_2 \qquad (19)$$

which is the surface thermal impedance of a single semi-infinite plane comprised of the second layer 14 material. Here $$R_2 = (4\pi f S_2 \rho_2 K_2)^{-1/2} \qquad (20)$$

If we consider the thickness of the first layer 12 to be finite and if the semi-infinite second layer 14 is missing, Equation 15 becomes:

$$\underline{Z} = R_1 \left( \frac{\sinh 2a - \sin 2a}{\cosh 2a - \cos 2a} - j \frac{\sinh 2a + \sin 2a}{\cosh 2a - \cos 2a} \right) \qquad (21)$$

which is the surface thermal impedance of a single plate of finite thickness.

If we consider the surface thermal impedance of the finite first layer 12 in perfect contact with the semi-infinite second layer 14, Equation 15 becomes:

$$\underline{Z} = \frac{1}{\underline{\xi}_1 K_1} \left( \frac{\cosh d\underline{\xi}_1 + \theta \sinh d\underline{\xi}_1}{\sinh d\underline{\xi}_1 + \theta \cosh d\underline{\xi}_1} \right) \qquad (22)$$

Turning now to FIG. 2, an Argand plot of the surface thermal impedance of the layer 12 of finite thickness in perfect contact with the semi-infinite layer 14 is shown. The Argand plot of FIG. 2 is normalized, thereby making it applicable to all combinations of materials by multiplying the ordinate and abscissa by $R_S = 1/2R_1$. The plots 28, 30, 32, 34 and 36 are representative, respectively, of $d/\delta$ having values of 0, 0.05, 0.1, 0.2 and 0.4. These plots are generated by holding $d/\delta$ constant at the shown value and varying $\theta$ from zero to infinity. The plots 38, 40, 42, 44, 46, 48 and 50 represent $\theta$ having values, respectively, of 0, 0.1, 0.164, 0.3, 0.5, 0.1 and 3. These plots are generated by holding $\theta$ at different values and varying $d/\delta$.

In FIG. 2, the straight-line plot 28 ($d/\delta = 0$) represents the surface impedance of a semi-infinite plane of a single material. Since the values on the line 28 were originally normalized by multiplying $\underline{Z}$ by $R_S = 1/2\,R_1$, values from the line 28 must be multiplied by $2R_1$ to again obtain $\underline{Z}$. Thus, for a given material, all values on the $d/\delta = 0$ plots actually give just one value of $\underline{Z}$. This value is given by $\underline{Z} = (1-j)R_2$, where $R_2 = (4\pi f S_2 \rho_2 K_2)^{1/2}$. If the first and second layers 12 and 14 are composed of the same material, $\theta = 1$ and $R_1 = R_2$. Thus, the same value is obtained for $\underline{Z}$ since $$\underline{Z} = 2R_1 \frac{(1-j)}{2}$$

which equals $(1-j)R_2$. If $d = $ infinity, the sinusoidal thermal wave does not penetrate the first layer 12 and the surface impedance again becomes that of a single material, as can be seen by inspecting FIG. 2. Thus, it is clear that all the $\theta$ and $d/\delta$ plots must pass through a common point at the value $\theta = 1$. The surface thermal impedance of a single-layer material backed by a perfectly insulating medium (i.e. $K_2=0$) can be obtained by letting $\theta=0$. Variations of thickness of a single layer thus generates the impedance locus shown on the extreme left of FIG. 2.

Therefore it is apparent that by measuring the surface thermal impedance variations of a test sample responsive to a sinusoidal heat flow applied thereto a measure of the physical characteristics of the sample may be obtained.

Turning to FIG. 3, an apparatus for determining the physical characteristics of a test sample is shown. In the embodiment of FIG. 3, a transducer 52 provides a sinusoidally varying temperature which is thermally coupled to a sample 54 via an air gap 56. The transducer comprises a heating layer 58 of foil or a fine wire grid which is mounted between the bottom of a cold liquid container 60 and the surface 62 of sample 54. The heating layer 58 is spatially supported from the bottom of container 60 by plastic electrical insulators 61 and 63. The bottom 64 of the container 60 will hereinafter be referred to as cold plate 64. The cold plate 64 is maintained at a constant cool temperature by the passage of a cooled fluid, such as water, through the container 60. The fluid is pumped via a pump 66 from coolant reservoir 68 through the container 60 through a refrigeration unit 70 and back to the coolant reservoir 68 to form a closed system.

An oscillator 72 generates a sinusoidal electrical signal which is fed via a differential amplifier 74 and a power amplifier 76 to the heating layer 58 to provide the sinusoidally varying heat flux into the sample 54. A resistor 78 mounted in the output of power amplifier 76 provides voltage and current signals which, are multiplied by a conventional multiplying circuit 80 to give a resultant power signal which is fed back to the differential amplifier 74, wherein it is compared to the output of oscillator 72 to provide feed-back regulation thereof and maintain the output of power amplifier 76 at a value corresponding to the oscillator output.

Two thermocouples 82 and 84 are mounted, respectively, in contact with the heating layer 58 and the surface 62 of sample 54. The output of each thermocouple is fed to an associated input of a differential amplifier 86. The output from differential amplifier 86 is fed to an axis input of an X–Y recorder 88. The output from thermocouple 84 is also fed to the other axis input of the X–Y recorder 88.

For the embodiment of FIG. 3 the air gap between the surface 62 of sample 54 and heating layer 58 is relatively small. The thermal resistance of the air gap 56 is reasonably constant for small temperature changes. The total thermal capacitance of the air in the air gap 56 is small enough so that it may be neglected over the range of frequencies at which the heat flux is applied to the sample 54.

As stated previously, the surface thermal impedance of the test sample 54 is equal to the temperature of the sample surface divided by the heat flow into the sample surface and is expressed as $$\underline{T}=q\underline{Z} \quad (18)$$

With the embodiment of FIG. 3, the heat flux into the sample 54 is approximated for practical purposes by $$q=\Delta\underline{T}/R_G \quad (23)$$

where $R_G$ is the total air gap thermal resistance between the heating layer 58 and surface 62 of sample 54, $\Delta\underline{T}$ is the total temperature drop between the surface 62 of sample 54 and the heating layer 58. Combining Equations 18 and 23 gives $$\underline{Z}=\underline{T}R_G/\Delta T \quad (24)$$

As stated, the oscillator 72 via power amplifier 76 feeds a sinusoidal signal into the heating layer 58 to provide a sinusoidal heat flux into the surface 62 of sample 54. The thermocouples 82 and 84 attached to heating layer 58 and surface 62, respectively, provide the measurement of the temperature differentials between the surface 62 and heating layer 58. This temperature differential is determined by subtracting the two signals from the thermocouples 82 and 84 in the differential amplifier 86. The temperature of the surface 62 of sample 54 is determined by the thermocouple 84. $R_G$ is, as stated, a constant and, therefore, when the output of the differential amplifier 86 ($\Delta T$) and the output from thermocouple 84 (T) is fed to the different axis inputs of an X–Y recorder 88, the recorder will generate responsive thereto a Lissajous figure whose ordinate amplitude is a relative measure of the amplitude of the surface thermal impedance $\underline{Z}$ and whose ordinate interiept is an exact measure of the phase angle of the thermal surface impedance $\underline{Z}$. Thus, a measure of the thermal surface imepdance ($\underline{Z}$) is obtained responsive to a sinusoidal heat flux applied to the surface 62 of sample 54 and wherefrom the physical characteristics of the sample 54 may be determined.

Utilizing the embodiment of FIG. 3, the results shown in tabular form were obtained with an air gap 56 of 0.050 inch and 0.003-inch diameter copper-constantan thermocouples 82 and 84 attached to the heating layer 58 and surface 62 of sample 54 by soldering or cementing, depending upon the material of the sample 54. The samples 54B were 3-inch long blocks with thin plates 54A 3 inches square for the surface layers. A thin layer of heat conducting grease was used in the joint between the plates 54A and blocks 54B. As set forth in Equation 11, the blocks 54B appear essentially semi-infinite in the range of frequencies used in the measurements given in the table. No insulation was provided on the sides of the sample 54, since temperature changes were small and temperature measurements were made near the centers of the end areas. The corresponding theoretical computed values for each measurement are also shown in the table for comparison. The value of $R_G$, the thermal resistance of air gap 56, was computed from data found in "Heat Transfer" by M. Jakob, vol. 1, 1949, p. 69, John Wiley and Son. The anomaly in phase and amplitude found in the .177-inch steel-glass sample between the theoretical and measured surface impedance was due to nonequilibrium conditions existing during phase measurement. The anomaly in phase found in the Teflon sample was due to poor attachment of the thermocouples 82 and 84.

CALCULATED AND MEASURED VALUES OF Z FOR ONE- AND TWO-LAYER SAMPLES

| Sample type | | Freq. (c.p.s.) | Measured Z, ° C. cm.² sec./ cal. | Theoretically computed Z, ° C. cm.² sec./ cal. |
| --- | --- | --- | --- | --- |
| 1st layer | 2nd layer | | | |
| .036" steel | Quartz | 1/30 | 35.8/−65° | 33.2/−64° |
| .036" steel | Glass | 1/30 | 36.5/−67° | 36.2/−69° |
| .038" steel | do | 1/65 | 57.6/−64° | 64.6/−64° |
| .036" steel | Teflon | 1/30 | 47.1/−76° | 46.2/−76° |
| Stainless steel | | 1/30 | 9.3/−43° | 11.7/−45° |
| Teflon | | 1/30 | 165.0/−36° | 120.0/−45° |
| .177" steel | Quartz | 1/30 | 12.9/−72° | 11.4/−76° |
| .177" steel | Glass | 1/40 | 11.3/−67° | 11.9/−77° |
| .177" steel | Teflon | 1/30 | 13.5/−79° | 12.0/−79° |
| .177" steel | Quartz | 1/83 | 30.6/−77° | 27.9/−76° |

Turning now to FIG. 4, an alternate embodiment is shown for the practice of the present invention. The alternate embodiment of FIG. 4 differs in structure from the embodiment of FIG. 3 only in that the thermocouple 82 connected to the heating layer 58 is deleted and two thermocouples 90 and 92 are inserted in the gap 56 to measure $\Delta\underline{T}$ across a small portion thereof. The outputs of the thermocouples 90 and 92 are fed to the inputs of the differential amplifier 74. The output of the thermocouple 84 is fed only to the one axis input of the X–Y recorder 88. The output of the differential amplifier 86, as for embodiment 3, is fed to the other axis input of the X–Y recorder.

The embodiment of FIG. 4 operates with the same general theory as the embodiment of FIG. 3, that is, $$Z=TR_G/\underline{\Delta T} \quad (24)$$

However, $\Delta T$ is determined from the two thermocouples 90 and 92 positioned in the air gap 56 so as to sample a small portion thereof. Where small temperature fluctuations exist in the gap 56, the gap resistance is linear and therefore sampling of a small portion thereof will give a measure of the total temperature differential across the gap. Thus, the output from thermocouples 92 is proportional for the present invention to the $\Delta T$ existing across the gap 56.

In operation, the embodiment of FIG. 4 functions the same as the embodiment of FIG. 3, with the Lissajous figure produced by the X–Y record 88 being proportional in amplitude to the amplitude of the surface thermal impedance $\underline{Z}$ of the sample 54 and having an ordinate intercept which is an exact measure of the phase angle of the surface thermal impedance $\underline{Z}$ of sample 54.

DESCRIPTION OF THE PREFERRED EMBODIMENT

FIG. 5 illustrates the preferred embodiment for the practice of the present invention. The embodiments of FIGS. 3 and 4 require that a thermocouple be attached to the surface 62 of sample 54. In the embodiment of FIG. 5 this is avoided and only one thermocouple is required. The output from the multiplier circuit 80, which is a measure of the electrical power supplied to the heating layer 58, is fed to one axis input of the X–Y recorder 88. The thermocouple 82 connected to the heating layer 58 is fed directly to the other input of the X–Y recorder 88.

As for the embodiments of FIGS. 3 and 4, the oscillator 72 through power amplifier 76 furnishes a sinusoidal electrical signal to the heating layer 58 which transmits a sinusoidal heat flux into the sample 54. The closed loop cooling system operates and is constructed the same as described for the embodiments of FIGS. 3 and 4 to provide a constant low-temperature cold plate 64. The resistor 78 furnishes a voltage and current signal of the output of power amplifier 76 to the conventional multiplier circuit 80 whose output is thus proportional to the power input to the heating layer 58.

Further understanding of the embodiment of FIG. 5 may be obtained by consideration of the theory of operation thereof. The embodiment of FIG. 5 operates by measuring the thermal input impedance $\underline{Z_x}$ of the transducer 52 instead of measuring the surface thermal impedance $\underline{Z}$ of the sample 54 as is done in the embodiments of FIGS. 3 and 4. The thermal input impedance of the transducer 52 is related to the surface thermal impedance of the sample 54 by a transformation $$\frac{1}{\underline{Z_x}} = \frac{1}{\underline{Z_o}} + \frac{1}{R_G + \underline{Z}} \quad (25)$$

where $\underline{Z_x}$=the thermal input impedance of transducer 52, $\underline{Z_o}$=the characteristic thermal impedance of the transducer 52, $\underline{Z}$=the surface thermal impedance of the sample 54 and $R_G$=the thermal resistance of the gap 56 between the heating layer 58 and the sample 54. From Equation 25

$$\underline{Z_x} = \frac{\underline{Z_o}(R_G + \underline{Z})}{R_G + \underline{Z} + \underline{Z_o}} \quad (26)$$

and $$\underline{Z} = \frac{\underline{Z_x}\underline{Z_o}}{\underline{Z_o} - \underline{Z_x}} - R_G \quad (27)$$

The thermal input impedance of the transducer 52 ($\underline{Z_x}$) is obtained by measuring the temperature of the heating layer 58 and the power input to the heating layer 58 and is characterized by the realtionship $$\underline{Z_x} = \frac{\text{temperature of the heating layer 58}}{\text{the power input to the heating layer 58}} \times \text{a constant}$$

In the embodiment of FIG. 5, as stated, the power input to the heating layer 58 of transducer 52 is determined by measuring the current through the resistor 78 and the voltage across resistor 78 and multiplying them in the conventional multiplying circuit 80. The temperature of the heating layer 58 is determined directly by the thermocouple 82 attached thereto. The X–Y recorder 88 combines the signals, producing therefrom a Lissajous figure whose ordinate amplitude is a relative measure of the amplitude of $\underline{Z_x}$ and thus $\underline{Z}$, the surface thermal impedance of the sample 54, and whose ordinat intercept is a true measure of the phase angle $\underline{Z_x}$ and thus $\underline{Z}$, the surface thermal impedance of the sample 54.

Thus, measurements of thermal input impedance of the transducer 52 give a measure of the thermal surface impedance of the sample 54. The phase angle and relative amplitude measurements obtained with the embodiment of FIG. 5 agree with those predicted by transformation of the plane-wave impedance given by Equation 15. However, the agreement is frequency-dependent, since the transducer 52 appears as more nearly a point source at lower frequencies and more nearly a plane source at higher frequencies. Using the embodiment of FIG. 4, frequencies up to 1 cycle per second were found satisfactory with the transducer 52 mounted close to the surface 62 of sample 54. The gap 56 between the transducer 52 and surface 62 was filled with helium gas to improve coupling.

FIG. 6 shows a complex plane plot of experimentally measured input thermal impedances of the transducer 52 wherein the embodiment of FIG. 5 had the transducer 52 mounted adjacent different samples 54 having various thickness of Teflon on stainless steel. The peak thermal wave amplitudes at the transducer 52 were approximately $\pm 1°$ C. about room temperature. Variations at the surface 62 of the sample 54 were, of course, less than $\pm 1°$ C. Teflon thickness variations of 0.0005 inch were easily detected at 0.1 cycle per second. The curves 94 and 96 were obtained with applied heat flux frequencies of 0.5 and 0.1 cycles, respectively, and illustrate the locus of the input thermal impedance of transducer 52 (and therefore the surface thermal impedance of the sample 54) as the trickness of the Teflon layer was varied. The points 98 and 100 are for a 0.005-inch thick paper first layer on the stainless steel sublayer at the respective applied heat flux frequencies of 0.5 and 0.1 cycles per second. These points, 98 and 100, illustrate the effect of a change in composition of the surface first layer. Different thicknesses of paper generate a locus similar to that for Teflon by passing through the 0.005-inch paper points shown.

FIG. 7, a complex plane plot, illustrates the locus of the input thermal impedance of the transducer 52 (and hence the surface thermal impedance of the sample 54) as the transducer is placed near samples 54 of single materials having different thermal characteristics wherefrom the different materials may be detected. The curves 102 and 104 were obtained from measurements made at frequencies of 0.5 and 0.1 cycles per second respectively. Note that in FIG. 7 the constant axis multiplier B is different in this plot than in FIG. 6. due to the necessity of changing the drive amplitude.

Spacing variations between the transducer 52 and the surface 62 of sample 54 have been found to cause changes in input thermal impedance along a unique locus on the impedance plane. This locus differs from the locus generated by changes in thermal properties of the sample and thus spacing variations between the transducer 52 and the surface 62 of sample 54 may be compensated for using known signal handling techniques.

Persons skilled in the art will, of course, readily adapt the general teachings of the invention to embodiments far different than the embodiments illustrated. Accordingly, the scope of the protection afforded the invention should not be limited to the particular embodiments illustrated in the drawings and described above, but should be determined only in accordance with the appended claims.

The embodiments of the invention in which an exclusive property or privilege is claimed are defined as follows:

1. A device for nondestructively testing a sample comprising means for generating a sinusoidal heat flux, means for directing said sinusoidal heat flux into a surface of said sample, and means for measuring responsive to said heat flux the surface thermal impedance of said sample at the area thereof in contact with said heat flux.

2. The apparatus according to claim 1 wherein said heat flux generating and directing means comprise thermal transducer means mounted proximate the surface of said sample, means for generating a sinusoidal electrical signal, and means for applying said sinusoidal electrical signal to said thermal transducer to generate therefrom a sinusoidal heat flux into the surface of said sample.

3. The apparatus according to claim 2 wherein said sample surface thermal impedance measuring means comprise means for measuring said sinusoidal heat flux into said sample, means for measuring the temperature of the surface of said sample about the area of said heat flux and means for measuring the ratio of said sample surface temperature to said heat flux value to provide a signal proportional to said sample thermal impedance.

4. The apparatus according to claim 2 wherein said means for measuring said sample thermal surface impedance comprise first thermocouple means attached to the surface of said sample about the area thereof in contact with said heat flux, second thermocouple means attached to the surface of said thermal transducer adjacent the surface of said sample, means for differentially combining the output signals of said first and second thermocouple means, and means for measuring the ratio of the output of said first thermocouple means to the output of said differential combining means to provide a signal proportional to said sample surface thermal impedance.

5. The apparatus according to claim 2 wherein said means for measuring said sample surface impedance comprise a pair of thermocouples mounted between said transducer and said sample spatially with respect to the surfaces thereof and each other, a third thermocouple attached to the surface of said sample about the area thereof in contact with said heat flow, means for differentially combining the outputs of said pair of thermocouples, and means for measuring the ratio of the output of said third thermocouple to the output of said differential combining means, which output is a measure of the sample surface thermal impedance.

6. The apparatus according to claim 1 wherein said means for measuring said sample thermal surface impedance comprise means for measuring the power of said electrical signal applied to said transducer, means for measuring the temperature of the surface of said transducer adjacent the surface of said sample, and means for measuring the ratio of the output of said temperature measuring means to the output of signal power measuring means, which ratio is a measure of said sample thermal surface impedance.

7. An apparatus for nondestructively testing a sample comprising means for generating an electrical signal, a thermal transducer, means for applying said electrical signal to said thermal transducer to generate therefrom a sinusoidal heat flux into said sample, and means for measuring the input thermal impedance of said thermal transducer.

8. The apparatus according to claim 7 wherein said transducer input thermal impedance measuring means comprise thermocouple means attached to the surface of said transducer adjacent the surface of said sample, means for measuring the voltage of said electrical signal applied to said transducer, means for measuring the current of said signal applied to said transducer, means for multiplying the outputs of said voltage and current measuring means, and means for measuring the ratio of the output of said thermocouple means to the output of said multiplying means, which ratio is a measure of the thermal input impedance of said transducer.

References Cited
UNITED STATES PATENTS

| | | | |
|---|---|---|---|
| 2,269,968 | 12/1941 | De Forest | 73—15 |
| 2,972,882 | 2/1961 | Erwin | 73—15 |
| 3,222,917 | 12/1965 | Roth | 73—15 |

FOREIGN PATENTS

| | | |
|---|---|---|
| 873,393 | 4/1953 | Germany. |

OTHER REFERENCES

Ganot, Elementary Treatise on Physics, 1898, pp. 396–397.

RICHARD C. QUEISSER, Primary Examiner

J. K. LUNSFORD, Assistant Examiner

UNITED STATES PATENT OFFICE
CERTIFICATE OF CORRECTION

Patent No. 3,533,273　　　　　　　　　　Dated October 13, 1970

Inventor(s) Donald R. Green

It is certified that error appears in the above-identified patent and that said Letters Patent are hereby corrected as shown below:

Column 2, line 55, change "understand" to --understanding--.

Column 2, line 70, delete "where ∂ is the thermal diffusivity. For a steady-state sinus-", insert --where T is the temperature, t is time, S is specific heat,--.

Column 3, line 15, change "same" to --sample--.

Column 6, line 13, change "interiept" to --intercept--.

Column 7, line 12, change "record" to --recorder--.

Column 8, line 11, change "ordinat" to --ordinate--.

Column 8, line 43, change "trickness" to --thickness--.

SIGNED AND
SEALED
MAR 2 1971

(SEAL)
Attest:

Edward M. Fletcher, Jr.
Attesting Officer

WILLIAM E. SCHUYLER, JR.
Commissioner of Patents